Patented Sept. 28, 1948

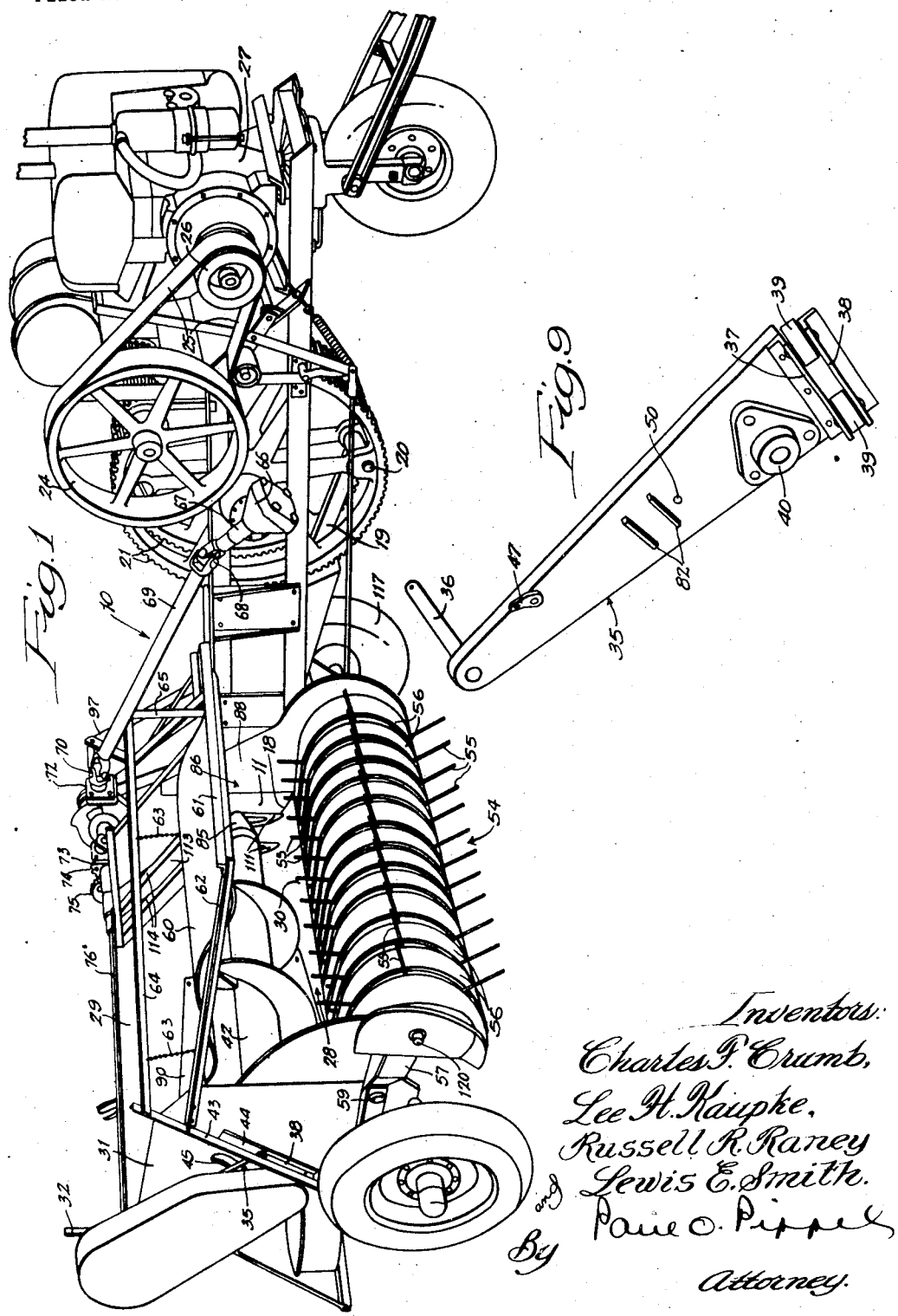

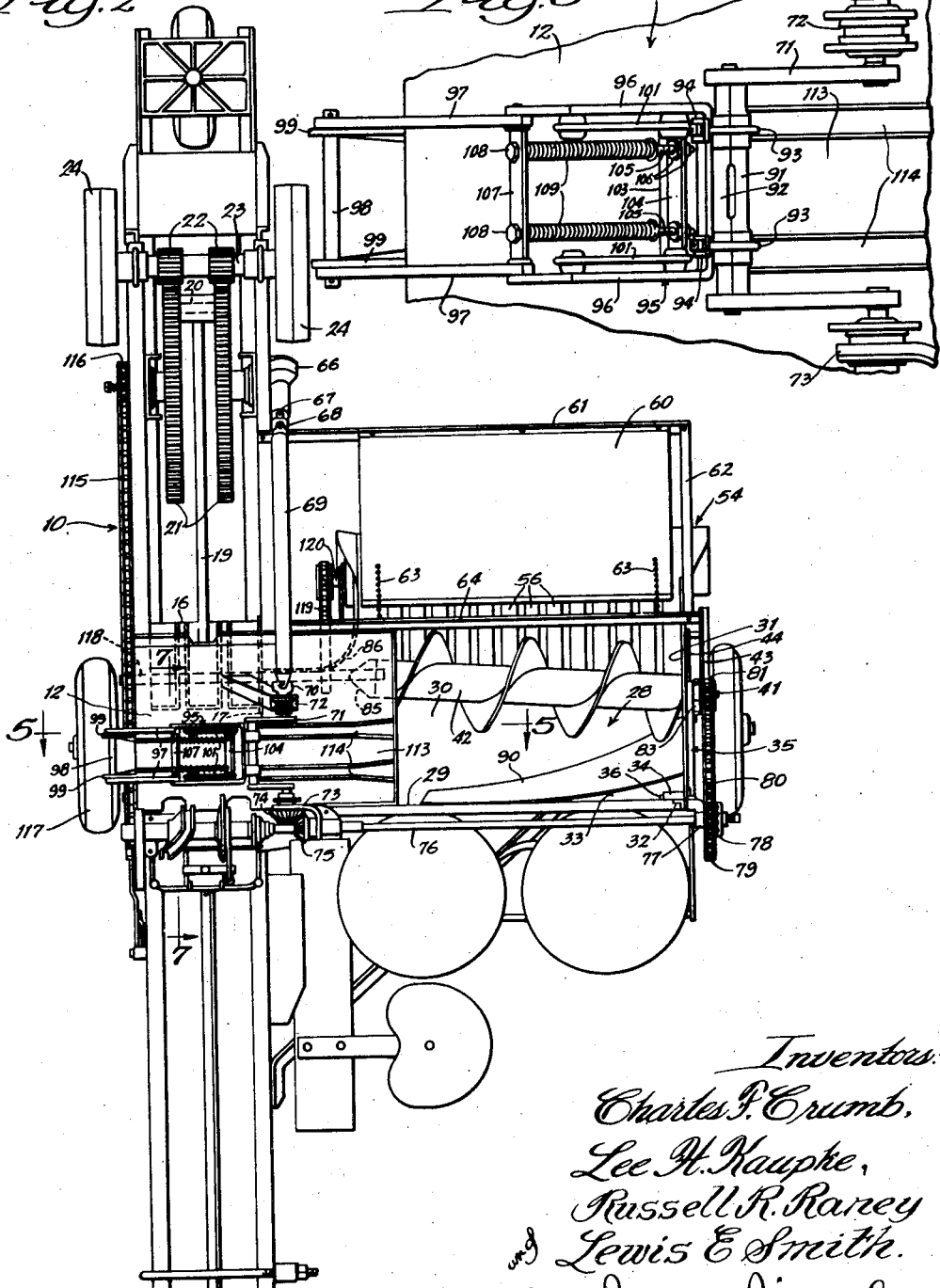

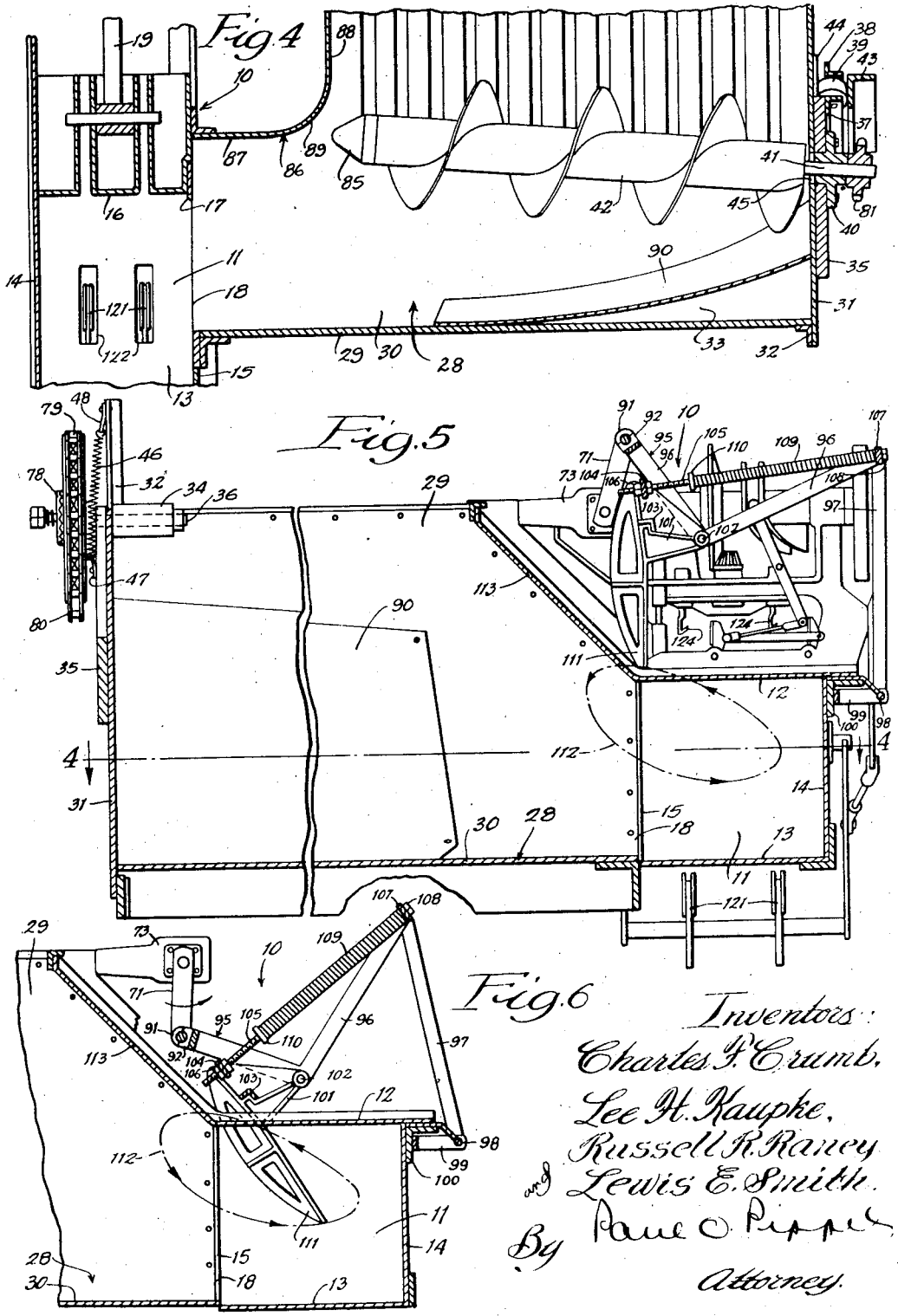

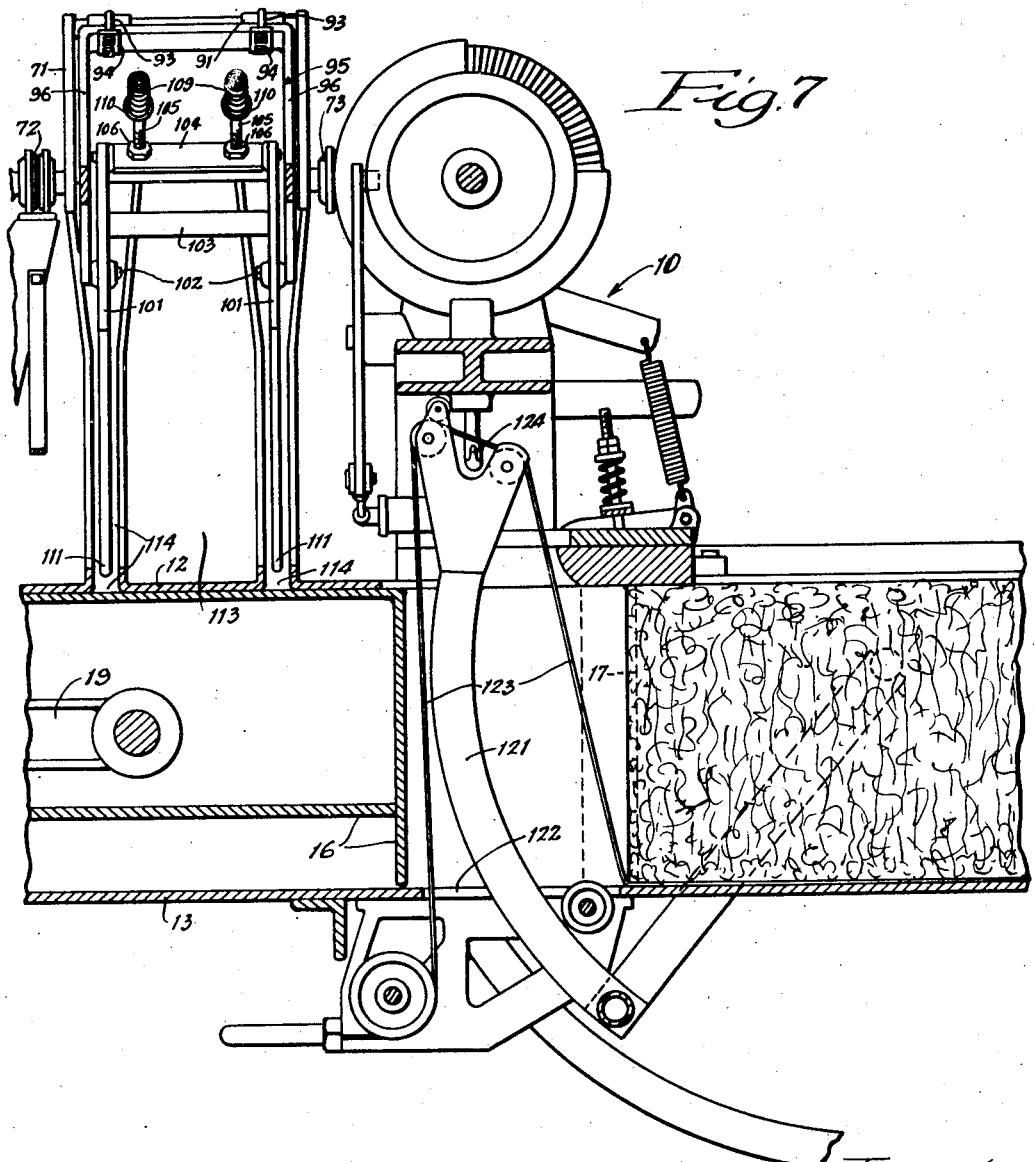

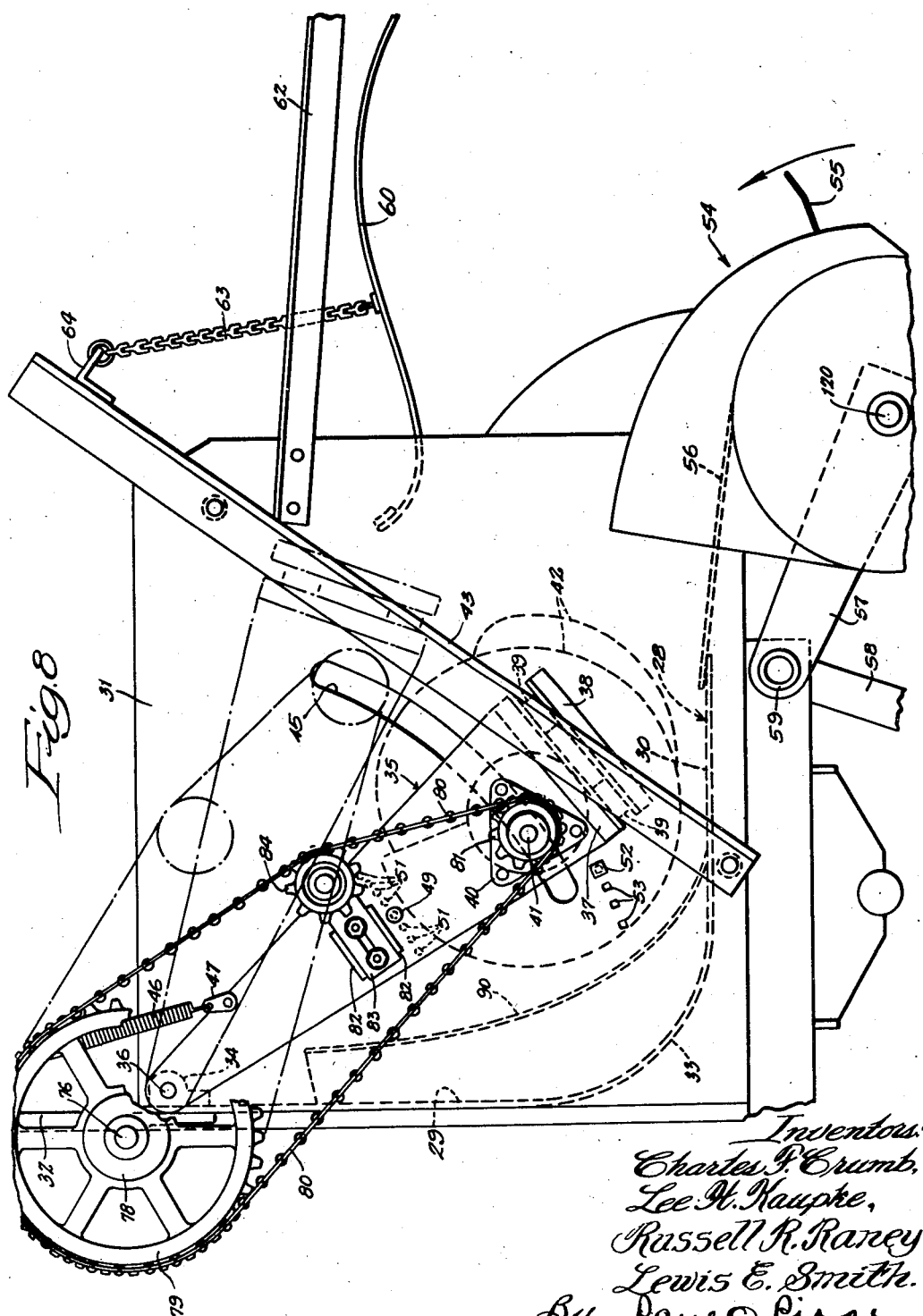

2,450,082

UNITED STATES PATENT OFFICE 2,450,082

PICKUP BALER

Charles F. Crumb, Clarendon Hills, and Lee H. Kaupke and Russell R. Raney, La Grange, and Lewis E. Smith, Congress Park, Ill., assignors to International Harvester Company, a corporation of New Jersey Application November 21, 1942, Serial No. 466,460

19 Claims. (Cl. 100—25)

This invention relates to a pick-up baler. More specifically it relates to a pick-up baler having a feed opening in a vertical side.

For the most part, pick-up balers are provided with baling chambers having an opening in the top side, a conveyer extending to the baling chamber at the level of the top thereof, and a vertically moving packer for compressing material moving from the conveyer into the top of the baling chamber. A pick-up baler with a feed opening in the vertical side thereof has the very obvious advantage that the material to be baled need not be lifted so far from the ground, and thus conveying means between the pick-up mechanism and the baling chamber may be simplified. However, the disadvantage with a baler of this sort is that it is difficult to move material to be baled through the feed opening in the vertical side of the baling chamber. The present invention has to do with means which will overcome this disadvantage.

An object of the present invention is to provide an improved pick-up baler.

A further object is to provide an improved baler having a feed opening in a vertical side thereof.

A further object is the provision of an improved conveyer for crops.

Still another object is to provide an improved conveying means for delivering material to be baled through the feed opening in the vertical side of a baling chamber.

Another object is to provide an improved mode of feeding material into a baling chamber.

Still another object is the provision of an improved conveying means for transferring crops from a pick-up device to a baling chamber.

Another object is the provision of an improved pick-up device.

Other objects will appear from the disclosure.

According to the present invention a crop platform extends laterally from a feed opening in the vertical side of a baling chamber. An auger feed device is mounted over the platform either floatingly or in fixed relation to the platform. A pick-up cylinder is positioned immediately in front of the platform. A packing shield is positioned over the pick-up cylinder. By this arrangement crops picked up by the pick-up cylinder and restrained in a vertical direction are fed along the platform by a floating pick-up cylinder to the feed opening in the vertical side of the baling chamber. Packing fingers move the crops from the end of the auger into the baling chamber.

In the drawings,

Figure 1 is a perspective view of the novel pick-up baler of the present invention;

Figure 2 is a plan view of the pick-up baler;

Figure 3 is an enlarged plan view of a portion of the pick-up baler;

Figure 4 is a sectional plan view taken along the lines 4—4 of Figure 5;

Figure 5 is a vertical sectional view taken along the line 5—5 of Figure 2;

Figure 6 is a vertical sectional view similar to Figure 5 but showing only a portion of what is shown in Figure 5 and certain parts in different position;

Figure 7 is a sectional view taken along the line 7—7 of Figure 2;

Figure 8 is an end view showing the crop platform and pick-up device of the pick-up baler of the present invention; and Figure 9 is a perspective view of the arm for supporting the auger feed device employed with the pick-up baler.

As seen in Figure 2, the pick-up baler of the present invention includes a baling unit 10. The baling unit 10 is provided with a baling chamber 11 having a top wall 12, a bottom wall 13, an outer side wall 14, and an inner side wall 15. Reciprocally mounted within the baling chamber 11 is a baling plunger 16 provided with a knife 17 secured to a vertical side thereof adjacent the inner wall 15 of the baling chamber. The inner side wall 15 of the baling chamber 11 is provided with a feed opening 18 through which crops to be baled pass. The knife 17 moving with the reciprocating plunger 16 across the opening 18 shears off any material not completely passed into the baling chamber 11. A connecting rod 19 is connected at one end to the baling plunger 16 and at the other end, to a pin 20, extending between large gears 21, which secures them to one another for joint rotation. The gears 21 are engaged by gears 22 on a shaft 23, to opposite ends of which are connected belt pulleys 24. As seen in Figure 1, a belt 25 engages one belt pulley 24 and also a belt pulley 26 secured upon a shaft driven by and extending from an engine 27.

As seen in Figures 4 and 5, a crop platform 28 extends transversely to the direction of movement of the baling plunger 16 in the baling chamber 11 from the baling unit 10 at the feed opening 18. The crop platform 28 comprises a vertical back 29 and a horizontal floor or bottom 30. Secured to the end of the crop platform 28 is a vertical sheet 31, and an angle bar 32 extends upwardly in contact with the sheet 31 and with the vertical back 29. Figure 8 shows that the vertical back 29 is joined with the horizontal floor 30 in a curved portion 33. As seen in Figure 8, a bearing bracket 34 is secured at the upper end of the vertical back 29 adjacent the vertical sheet 31 and serves for the support of an arm 35 shown in detail in Figure 9. As seen in this figure, the arm 35 has a short shaft 36 extending transversely from one end, which shaft is journaled in the bearing bracket 34. Secured to the lower end of the arm 35 is an angle member 37 and secured in spaced relation with the angle member 37 is a second angle member 38. The angle members are held in spaced relation to one another by stub shafts, not shown, upon which are journaled rollers 39. Secured to the arm 35 adjacent the lower end thereof is a bearing 40 which, as shown in Figure 4, rotatably supports a shaft 41 upon which is secured an auger feed device 42 positioned over the horizontal floor 30 of the crop platform 28. The arm 35 thus serves as a support for the auger feed device 42 and the arm by pivoting of the shaft 36 in the bearing bracket 34 also pivots and carries with it the auger feed device 42. An angle member 43 is secured in spaced relation with the outer side of the vertical sheet 31 and serves to hold the rollers 39 mounted upon the arm 35 between itself and a plate 44 secured to the vertical sheet 31. Thus, as the arm 35 pivots about the shaft 36 in the bearing bracket 34, the rollers roll along the angle member 43 and the plate 44. An arcuate slot 45 in the vertical sheet 31 provides for movement of the shaft 41 supporting the auger feed device 42 during pivoting of the arm 35. A counterbalancing spring 46 connected to a piece 47 secured to the arm 35 and to a piece 48 secured to the angle member 32 provides easy lifting of the arm 35 and auger feed device 42. In this way the auger feed device 42 may float over the floor 30 of the crop platform 28. If desired, the auger feed device 42 may be secured in a plurality of adjusted positions against movement toward and away from the floor 30, and this is accomplished by a pin 49 inserted through a hole 50 in the arm 35 and through any one of a plurality of holes 51 in the vertical sheet 31. Also, the arrangement may be such that the auger feed device is permitted to float, and yet the lowermost position thereof may be limited and varied. This is accomplished by insertion of a pin 52 through any one of a plurality of holes 53 in the vertical sheet 31. Limiting of the downward movement of the auger feed 42 comes from engagement of the arm 35 with the head of the pin 52.

A pick-up device 54 is positioned in front of the crop platform 28. This device includes a rotatable cylinder to which are attached tines 55 and a plurality of narrow, metallic strips 56 which extend about the cylinder and up on the floor 30, as shown in Figure 8. The pick-up device 54 is pivotally mounted, as shown in Figure 8, on an arm 57, which is controlled by an arm 58, which, along with the arm 57, is secured to a rock-shaft 59. Positioned above the pick-up device 54 is a hold-down sheet 60 of extended S-shape. As seen in Figure 1, the outer end of the sheet 60 is carried by a transverse angle member 61 supported at one end upon an angle member 62 secured to the vertical sheet 31 and at the other end, upon the top of the baling unit 10. The rear end of the sheet 60 is resiliently supported by chains 63 connected to a mid-point of the top thereof and to a transverse angle member 64 supported at one end upon the upper end of the angle member 43 and at the other end upon a member 65 extending upwardly from the top of the baling unit 10.

As seen in Figures 1 and 2, a gear-box 66 is positioned adjacent one end of the undesignated shaft upon which one gear 21 is secured and receives drive from this shaft and transmits it to a shaft 67 extending from the gear-box connected by the universal joint 68 to a shaft 69. The shaft 69 is connected by a universal joint 70 to a crank-shaft 71 supported at one end in a bearing bracket 72 and at the other end in a bearing bracket 73. One end of the crank-shaft 71 carries a bevel gear 74 meshing with a bevel gear 75 secured to a shaft 76 supported at one end of the bearing bracket 73 and at its outer end, adjacent the vertical sheet 31, in a bearing bracket 77. Mounted upon the shaft 76 is a clutch 78, to one side of which is secured a sprocket 79, also mounted upon the shaft 76. A sprocket chain 80 meshes with the sprocket 79 and also with a sprocket 81 secured to the shaft 41 upon which the auger feed device 42 is mounted. Thus, the auger feed device is driven. As seen in Figures 8 and 9, the arm 35 carries projecting guides 82 between which is positioned a bracket 83 secured to the arm 35 and carrying a tightening sprocket 84 meshing with the chain 80. As seen in Figure 8, the shaft 76, which drives the auger feed device, and the shaft 36, about which the auger feed device pivots, are sufficiently close together so that there is no very great effect upon the tightness of the chain in movement of the auger feed device between extreme positions as determined by the ends of the slot 45. As seen in Figure 4, the auger feed device is not quite parallel to the vertical back 29 of the crop platform 28 but extends slightly away from the back in a direction toward the baling unit 10. The auger feed device 42 is entirely supported at its end adjacent the vertical sheet 31 by the shaft 41 in the bearing bracket 40 secured to the arm 35. Thus, the auger feed device 42 carries a free open and unsupported end 85 which, because of the lack of parallelism between the auger feed device 42 and the vertical back 29, terminates adjacent a vertical wall 86 extending from the forward side of the feed opening 18 in the vertical side 15 of the bearing chamber 11. This wall 86 comprises a portion 87 extending outwardly transversely to the direction of the baling chamber 11, that is, the direction in which the baling plunger 16 reciprocates, a portion 88 extending in the direction of the baling chamber, and forming an end for the pick-up device 54, and an arcuate portion 89 joining the portions 87 and 88. A curved sheet 90 is secured at one end to the vertical back 29 of the crop platform 28 and at the other end to the vertical sheet 31 so as to provide at the rear of the auger feed device 42 a space increasing in width in a direction from the vertical sheet 31 to the baling chamber 11.

Upon the crank-shaft 71 is mounted a pair of bearing halves 91 and 92 held together by U-bolts 93, which, with the aid of members 94 through which the bolts extend, secure the bearing halves 91 and 92 to a U-shaped member 95. As shown in Figures 5 and 6, the U-shaped member 95 has legs 96 which are formed as L's. The extremities of the legs 96 are pivotally connected to spaced members 97 which are in turn pivotally mounted upon a shaft 98 supported in spaced brackets 99 secured to an angle member 100 attached at the side wall 14 of the baling chamber 11. Pivotally mounted on the L-shaped legs 96 of the U-shaped member 95 at the intersection of the legs of the L are packer members or fingers 101, as shown in Figures 5 and 6, upon an axis 102. Extending between the packer members 101 is an angle member 103 which is secured to the members 101 and serves to hold them in spaced relation. Also extending between the members 101 is a part 104 through which extend, as shown in Figures 3, 5, and 6, a pair of bolts 105 which are secured to the member 104 by nuts 106. The bolts 105 also extend through a member 107 extending between the members 97 at the point where the extremities of the legs 96 of the U-shaped member 95 are pivoted. The bolts 105 have heads 108 which engage the member 107, and springs 109 engaging the member 107 at one end, and an adjustable nut 110 on the bolts at the other end serves to maintain the heads 108 of the bolts 105 in engagement with the member 107. The lower ends of the packer members 101 are narrow and come generally to a point, as indicated at 111. The reference character 112 indicates in dash-dot lines a generally elliptical path followed by the lower end 111 of the packer fingers 101. The fingers 101 are moved in this path by rotation of the crank-shaft 71. Figure 5 illustrates one extreme position of the lower end 111 of the packer members 101 in which the ends 111 are above the top 12 of the baling chamber 11. Figure 6 illustrates another extreme position in which the end 111 of the packer members 101 is within the baling chamber 11. As seen in Figures 3 and 7, the top 12 of the baling chamber 11 and an extension 113 of the top 12 extending diagonally outwardly and upwardly from the top 12 have elongated flanged slots 114 which permit the necessary movement of the packer members 101 into and out of the baling chamber 11.

Positioned at the outer side of the baling chamber 11, as seen in Figure 2, is a sprocket chain 115 engaging a sprocket 116 secured to the undesignated shaft on which the gears 21 are secured. The sprocket chain 115 extends rearwardly of the baling units beyond a supporting wheel 117 and has a connection therewith, the arrangement being such that below a certain ground speed of the pick-up baler the chain 115 will be driven by the engine 27 through the shaft carrying the gears 21 and, above a certain ground speed, will be driven by the wheel 117. This arrangement is more fully shown and claimed in the patent to Russell R. Raney, No. 2,259,908, issued October 21, 1941. The chain 115 drives a shaft 118, in turn driving a sprocket chain 119, in turn driving a shaft 120 secured to the undesignated pick-up cylinder. Thus, since the chain 115 is driven by the ground wheel 117 down to a predetermined ground speed, the pick-up device 54 is also driven by the ground wheel 117 down to this certain ground speed.

In operation, the pick-up baler is moved over the ground by a tractor, as shown, in the direction of the length of the baling chamber 11. The pick-up device picks up crops and moves them to the auger feed device 42. The packing shield 60 above the pick-up device 54 compresses and holds down the crops picked up, so that they tend not to be thrown over the top of the auger feed device. As the crops reach the auger feed device, they pass mainly under it, since the auger feed device is floatingly mounted and tends to ride over the crops. Rotation of the auger feed device feeds the crops transversely along the path 28 toward the baling unit 10 both beneath the auger feed device and behind it in the space between it and the back 29 of the platform 28. The crops also move between the auger feed device 42 and the shield 90. As the crops come opposite the unsupported end 85 of the auger feed device 42, they pass into an enclosed space bounded at the front by the portion 87 of the wall 86, at the rear by the vertical back 29 of the platform 28, at the top by a sloping extension 113 of the top 12 of the baling chamber 11, and at the bottom by the floor 30 of the platform 28. They become somewhat compressed as they move into this space, and they are moved positively through the feed opening 18 in the vertical side 15 of the baling chamber 11 by the ends 111 of the packing fingers 101 which move through the path 112. Because of the compression of the crops in the aforementioned space, a more sizable quantity of crops is moved by the packing fingers 101 in each stroke. Since the auger feed device 42 floats and thus feeds crops along the platform 28 toward the baling chamber 11 beneath itself and to a large extent between itself and the back 29 of the platform, and the auger feed device 42 terminates adjacent the front of the aforementioned space, there is not too great a compression and forcing by the auger feed device 42 in the aforementioned space which might cause unsatisfactory crowding of the space during the time when the opening in the baling chamber is closed. Because of the compression of the crops in the aforementioned space to an extent obviously much less than that of the crops in the baling chamber 11 by the plunger 16, the space may be called a precompression chamber. The mounting of the auger feed device 42 so that it pivots in an arc as indicated by the arcuate slot 45, through which the supporting shaft 41 extends, causes the auger feed device to move toward and away from the back 29 as it moves toward and away from the floor 30. Thus, as the auger 42 moves toward or away from the floor 30 with decrease or increase in flow of crops from the pick-up device 54, the auger 42 moves toward or away from the back 29 to accommodate the lesser or greater amount of crops.

The position of the path 112 may be adjusted somewhat by adjustment of the nuts 106 which secure the bolt 105 to the piece 104 extending between the packing members 101 so that the innermost point of the path 112 may be either nearer or farther away from the wall 14 of the baling chamber 11. Thus, the lower ends 111 of the packing members 101 may be made more or less aggressive in moving the crops toward the vertical wall 14 of the baling chamber 11. The packing members 111 may be adjusted to reach a point nearer the vertical wall 14 than that shown by the path 112. As the path 112 indicates, the lower ends 111 of the packing members 101 move from the enclosed space just outside the feed opening 18, through the feed opening 18, into the baling chamber 11, then upwardly through the top 12 of the baling chamber, then outwardly through the sloping extension 113 of the top 12, and back to the original point outside the baling chamber 11. It will be understood that the movement of the packing members 101 is timed with that of the baling plunger 16, so that, when the lower end 111 of the packing members 101 is in the extreme position of Figure 6, the baling plunger is retracted, and that the baling plunger is moved forward on a compression stroke only when the lower end 111 is out of the baling chamber 11, as indicated in the position in Figure 5. As previously stated, the packing members 101 are mounted at 102 on the member 95 and may yield with respect thereto by virtue of the springs 109 on the bolts 105. Since the packing fingers 101 may yield, the side 14 of the baling chamber 11 will not be pushed out if too great a wad of hay is moved into the chamber 11 by the packing members 101. The packing members 101 may also yield if they strike an obstruction such as a log or a stone moved with the hay into the baling chamber.

Bales formed by the baling plunger 16 are tied by means more completely illustrated and claimed in the copending application of Lee H. Kaupke, et al., Serial No. 466,461, filed November 21, 1942, which has issued as Patent No. 2,446,878, dated August 10, 1948. This means is shown to some extent in Figures 5 and 7 and includes a pair of needles 121, which move upwardly through the baling chamber 11, through slots 122 in the baling plunger 16, and carry a baling wire 123 across the baling chamber 11 and engage it over twisting hooks 124.

The sheet 90, positioned between the auger feed device 42 and the back 29 of the platform 28, causes the available spacing behind the auger feed device 42 to increase in width in a direction toward the baling chamber 11. This is of advantage, because at the end of the auger feed device 42 adjacent the vertical side sheet 31 the amount of crops is small and the amount becomes greater as the distance to the baling chamber is less, for the amount of crops at any certain point in the length of the auger includes not only that picked up by the pick-up device at that point but also that picked up by the points on the pick-up device closer to the side sheet 31.

It will be apparent from the foregoing description that a new and novel baler pick-up construction has been provided. This includes an auger feed device positioned immediately adjacent a pick-up device for transferring crops to a baling chamber. The packing shield over the pick-up device compresses and holds down the crops so that the auger feed device may, by virtue of its floating mounting, for the most part convey crops toward the baling chamber beneath itself and behind itself. Thus, the crops move to the baling chamber in a more compressed condition. Packing members move the crops positively from the end of the auger feed device into the baling chamber. The auger feed device is novel insofar as its use for conveying crops to a feed opening in a vertical side of a baling chamber is concerned. The auger feed device is also novel as concerns its floating mounting, and this is true whether it be employed in conjunction with a baling press or with some other crop-treating device. The use of an auger feed immediately adjacent a pick-up cylinder is also novel in its application to a baling chamber, and this is also true of the hold-down sheet positioned over the pick-up device. The provision of means for positively feeding crops through a feed opening in the vertical side of a baling chamber is also novel in certain aspects.

The packing fingers or members are claimed in the present application per se and in combination with the feed opening in the vertical side of the baling chamber and also in combination with said feed opening and with the conveyer which moves material to be baled toward the said feed opening. However, it is to be noted that there are no claims in the present application involving the packing fingers and/or the feed opening in the vertical side of the baling chamber in combination with the means for feeding the baling wire vertically across the baling chamber. Claims to this subject-matter are contained in the aforementioned copending application of Kaupke, et al.

The intention is to limit the invention only within the scope of the appended claims.

What is claimed is:

1. In combination, a supporting means, means forming a baling chamber extending in a certain direction and having a feed opening in a vertical side thereof, means mounting the last-mentioned means on the supporting means, a plunger mounted in the baling chamber for reciprocation in the said certain direction, a spiral feed element extending generally transversely of the said certain direction of the baling chamber generally toward and at the level of the feed opening for feeding material to be baled to the said feed opening, and means mounting the end of the spiral feed element away from the baling chamber upon the supporting means so as to leave the end adjacent the baling chamber open and unsupported, and said mounting means including means for floatingly mounting the spiral feed element above said platform whereby the spiral feed element rises and falls with variations in the incoming quantities of material to said platform.

2. In combination, a supporting means, means forming a baling chamber extending in a certain direction and having a feed opening in a vertical side thereof, means mounting the last-mentioned means upon the supporting means, a plunger mounted in the baling chamber for reciprocation in the said certain direction, means for feeding material to be baled through the said feed opening including a spiral feed element extending generally transversely of the said certain direction of the baling chamber generally toward and at the level of the feed opening, means mounting the end of the spiral feed element away from the feed opening upon the supporting mans so as to leave the end adjacent the feed opening open and unsupported, a member moving reciprocally transversely of the direction of and extending into the baling chamber in timed relationship with the plunger for moving the material to be baled from the open end of the spiral feed element into the baling chamber at a time when the bale compressing plunger is receding, and means mounting the member upon the supporting means.

3. In combination, a supporting means, means forming a baling chamber extending in a certain direction and having a feed opening in a vertical side thereof, means mounting the last-mentioned means on the supporting means, a plunger mounted in the baling chamber for reciprocation in the said certain direction, an auger feed device extending transversely of the direction of the baling chamber at the level thereof and having an open, free, and unsupported end adjacent the baling chamber, means supporting the other end of the auger feed device upon the supporting means, a member extending from above the level of the top of the baling chamber to below the level thereof, means mounting the upper end of the member above the baling chamber on the supporting means, means for moving the lower end of the member into the baling chamber through the feed opening at a time when the plunger is receding for moving the material to be baled from the open end of the auger feed device into the baling chamber, and means mounting the last-mentioned means on the supporting means.

4. In combination, a supporting means, means forming a baling chamber extending in a certain direction and having a feed opening in a vertical side thereof, means mounting the last-mentioned means on the supporting means, a plunger mounted in the baling chamber for reciprocation in the said certain direction, and means for feeding material to be baled through the said feed opening including a finger, means mounting the finger on the supporting means, means moving the finger through the feed opening in the vertical side wall into the baling chamber and then out through the top of the baling chamber at timed intervals when the plunger is in a non-compressing position, means mounting the last-mentioned means on the supporting means, an augur feed device extending transversely of the direction of the baling chamber and terminating in an open, unsupported end adjacent the feed opening so as to adapt material conveyed by the auger feed device to be moved by the finger through the feed opening into the baling chamber, and means mounting the opposite end of the auger feed device upon the supporting means.

5. In combination, a supporting means, means forming a baling chamber extending in a certain direction and having a feed opening in a vertical side thereof, means mounting the last-mentioned means on the supporting means, a plunger mounted in the baling chamber for reciprocation in the said certain direction, walls extending transversely of the direction of the baling chamber from around the feed opening in the vertical side wall to enclose a receiving space for material on its way through the feed opening into the baling chamber, means mounting the walls on the supporting means, an auger feed device extending transversely of the direction of the baling chamber and terminating in an open, unsupported end at the receiving space spaced from the feed opening in the baling chamber for feeding material to be baled to the receiving space, means mounting the auger feed device on the supporting means, means movable from the receiving space through the feed opening into the baling chamber at timed intervals with the movement of the plunger for moving the material into the baling chamber at a time when the plunger is not in front of the feed opening, and means mounting the last-mentioned means upon the supporting means.

6. In combination, a supporting means, a crop-treating device extending in a certain direction and adapted to pass crops through itself in the said certain direction, means mounting the crop-treating device on the supporting means, a platform extending from the crop-treating device transversely to the said certain direction, means mounting the platform on the supporting means, an auger feed device extending over the platform transversely to the said certain direction, means including a supporting arm pivotally carried by the platform on which the auger feed device is rotatably supported for floatingly mounting the auger feed device on the supporting means for movement bodily throughout its length to aid the auger feed device in feeding crops over the platform to the crop-treating device, and means for feeding crops to said auger along substantially its entire length.

7. In combination, a platform having a horizontal floor and a vertical back, an auger feed device extending along the platform, means for feeding material across the platform to the auger over the full length thereof, and means including a supporting arm pivotally carried by the platform on which the auger feed device is rotatably supported for mounting the auger feed device upon the platform for translatory floating movement toward and away from the floor and simultaneously therewith movement toward and away from the back so as to enable the auger feed device to feed crops along the platform between itself and the floor and between itself and the back.

8. In combination, a supporting means, a platform, means mounting the platform on the supporting means, an auger feed device positioned over the platform, means floatingly mounting the auger feed device for uniform movement in a vertical direction over the entire length of the auger above the supporting means to enable the auger feed device to feed crops beneath itself along the platform, a pick-up device positioned in front of the platform for feeding crops to substantially the full length of the auger feed device, means mounting the pick-up device on the supporting means, a hold-down member positioned over the pick-up device for holding down and compressing crops picked up by the pick-up device to assure feeding of the crops along the platform by and beneath the auger feed device, and means mounting the hold-down member upon the supporting means.

9. In combination, a supporting means, a platform having a horizontal floor and a vertical back, means mounting the platform on the supporting means, a pick-up device positioned in front of the platform for delivering crops, means mounting the pick-up device on the supporting means, an auger feed device extending along the platform, means including an arm swingably mounting the auger feed device on the supporting means for vertical translatory movement so as to enable the auger feed device to pass beneath itself crops received from the pick-up device and to feed the crops along the platform between itself and the back, a hold-down member positioned over the pick-up device for compressing and holding down the crops delivered to the auger feed device to assure passage of the crops beneath the auger feed device, and means mounting the hold-down member on the supporting means.

10. In combination, a supporting means, a crop-treating unit adapted to move crops through it in a certain direction and having a feed opening in a vertical side, means mounting the crop-treating unit on the supporting means, a platform extending transversely from the crop-treating unit, means mounting the platform on the supporting means, an auger feed device positioned on the platform and extending transversely of the said certain direction toward the crop-treating unit, means floatingly mounting the auger feed device for uniform vertical movement over the length of the auger above the supporting means so as to enable the auger feed device to feed crops beneath itself along the platform toward the feed opening, a pick-up device positioned in front of the platform for delivering crops thereto, means mounting the pick-up device on the supporting means, a resilient hold-down member positioned over the pick-up device for compressing and holding down crops picked up by the device to assure their being fed along the platform by the auger feed device beneath the auger feed device, and means mounting the hold-down member on the supporting means.

11. In combination, a supporting means, means forming a baling chamber extending in a certain direction and having a feed opening in a vertical side thereof, means mounting the last-mentioned means on the supporting means, a plunger mounted in the baling chamber for reciprocation in the said certain direction, a platform having a vertical back and a horizontal floor extending transversely to the direction of the baling chamber from the vertical side thereof having the feed opening, means mounting the platform on the supporting means, a pick-up device substantially coextensive with and positioned in front of the platform for delivering crops, means mounting the pick-up device on the supporting means, an auger feed device extending over the floor transversely to the direction of the baling chamber and terminating in an open unsupported end near the feed opening and adapted to receive material along its entire length, means floatingly mounting the auger feed device on the supporting means for translational vertical movement with respect thereto to enable the auger feed device to pass beneath itself crops delivered by the pick-up device and to feed the crops over the floor between itself and the back toward the feed opening in the baling chamber, a hold-down member positioned over the pick-up device for compressing and holding down the crops delivered to the auger feed device to assure passage of the crops by the auger feed device beneath the auger feed device, and means mounting the hold-down member on the supporting means.

12. In combination, a platform having a vertical back and a horizontal bottom, an auger feed device extending along the platform for conveying crops along the platform from one end toward the other end, and means mounting the auger feed device upon the platform, the auger being so positioned with respect to the back of the platform as to provide a space between the back of the platform and the auger feed device increasing in width in a direction from the said one end toward the said other end for at least a substantial portion of the length of the auger feed device.

13. In combination, a platform having a vertical back and a horizontal bottom, an auger feed device extending along the platform from one end toward the other end, and means floatingly mounting the auger feed device upon the platform so as to enable the auger feed device to feed crops along the platform between itself and the back and between itself and the bottom, the auger being so located as to provide a space between itself and the back of the platform increasing in width in a direction from the said one end toward the said other end for at least a substantial portion of the length of the auger feed device.

14. In combination, a platform having a vertical back and a horizontal bottom, an auger feed device extending along the platform from one end toward the other end, and means mounting the auger feed device upon the platform for translational floating movement toward and away from the bottom and simultaneously therewith toward and away from the back, the auger feed device being so located as to provide a space between itself and the back of the platform increasing in width in a direction from the said one end toward the said other end for at least a substantial portion of the length of the auger feed device.

15. In combination, a supporting means, a crop-treating device extending in a certain direction and adapted to pass crops through it in the said certain direction, means mounting the crop-treating device on the supporting means, a platform extending from the crop-treating device transversely to the said certain direction, means mounting the platform on the supporting means, an auger feed device extending over the platform transversely to the said certain direction for conveying crops along the platform toward the crop-treating device, means mounting the auger feed device on the supporting means for translational floating movement toward and away from the platform, and means providing an adjustable stop for an adjustment of the lowermost position of the auger feed device with respect to the platform.

16. In combination, a supporting means, a platform, means mounting the platform on the supporting means, an auger feed device extending over the platform, means mounting the auger feed device on the supporting means for translational swinging movement with respect thereto, a pick-up device positioned immediately adjacent the auger feed device in parallel relation thereto for picking up and transferring crops to the auger feed device, means mounting the pick-up device on the supporting means, and a resilient hold-down member positioned over the pick-up device for compressing and holding down crops picked up by the pick-up device to cause them to arrive at the auger feed device in a more suitable condition for handling thereby.

17. In combination, a supporting means, a platform, means mounting the platform on the supporting means, an auger feed device extending over the platform, means mounting the auger feed device on the supporting means for translational floating movement toward and away from the platform, a pick-up device positioned immediately adjacent the auger feed device in parallel relation thereto for picking up and transferring crops to the auger feed device, means mounting the pick-up device on the supporting means, and a resilient hold-down member positioned over the pick-up device for compressing and holding down crops picked up by the pick-up device to enable them better to be fed beneath the floating auger feed device.

18. In combination, a supporting means, means forming a baling chamber extending in a certain direction and having a feed opening in a vertical side, means mounting the last-mentioned means on the supporting means, means forming a space or precompression chamber extending transversely of the said certain direction from the feed opening, means mounting the last-mentioned means on the supporting means, a platform having a vertical back and a horizontal floor extending transversely of the said certain direction, an auger feed device extending along the platform transversely to the said certain direction to the space or precompression chamber, arm and spring means floatingly mounting the auger feed device on the supporting means for translatory movement with respect thereto, a pick-up device positioned in front of the platform for delivering material to the auger feed device, means mounting the pick-up device on the supporting means, a hold-down member mounted over the pick-up device for holding down and compressing material delivered by the pick-up device to the auger feed device to enable the auger feed device to pass beneath itself the delivered material and to transfer it between the back and itself along the floor to the space or precompression chamber, and means mounting the hold-down member upon the supporting means.

19. In combination, a supporting means, a baling unit, means mounting the baling unit on the supporting means, a platform extending from the baling unit, means mounting the platform on the supporting means, a conveyer extending over the platform toward the baling unit, means floatingly mounting the conveyer on the supporting means to aid the conveyer in feeding material over the platform to the baling unit, and a member movable into the baling unit through a feed opening in a vertical side of the baling unit for moving the material to be baled from the conveyer into the baling unit.

CHARLES F. CRUMB.
LEE H. KAUPKE.
RUSSELL R. RANEY.
LEWIS E. SMITH.

REFERENCES CITED

The following references are of record in the file of this patent:

UNITED STATES PATENTS

| Number | Name | Date |
|---|---|---|
| 563,543 | Alter | July 7, 1896 |
| 1,075,376 | Pearson et al. | Oct. 14, 1913 |
| 1,195,479 | Kolp | Aug. 22, 1916 |
| 1,295,173 | Joy | Feb. 25, 1919 |
| 1,684,573 | Boyd | Sept. 18, 1928 |
| 1,780,472 | Gilger | Nov. 4, 1930 |
| 1,783,400 | Bockwitz | Dec. 2, 1930 |
| 1,815,327 | Raney et al. | July 21, 1931 |
| 2,060,569 | Greenlaw | Nov. 10, 1936 |
| 2,097,353 | Tallman et al. | Oct. 26, 1937 |
| 2,234,465 | Carroll | Mar. 11, 1941 |
| 2,269,977 | Johnson | Jan. 13, 1942 |
| 2,270,471 | Pilcher et al | Jan. 20, 1942 |
| 2,293,679 | Barker | Aug. 18, 1942 |
| 2,294,440 | Barker | Sept. 1, 1942 |
| 2,324,261 | Krause | July 13, 1943 |
| 2,362,861 | Russell | Nov. 14, 1944 |